Figure 1:
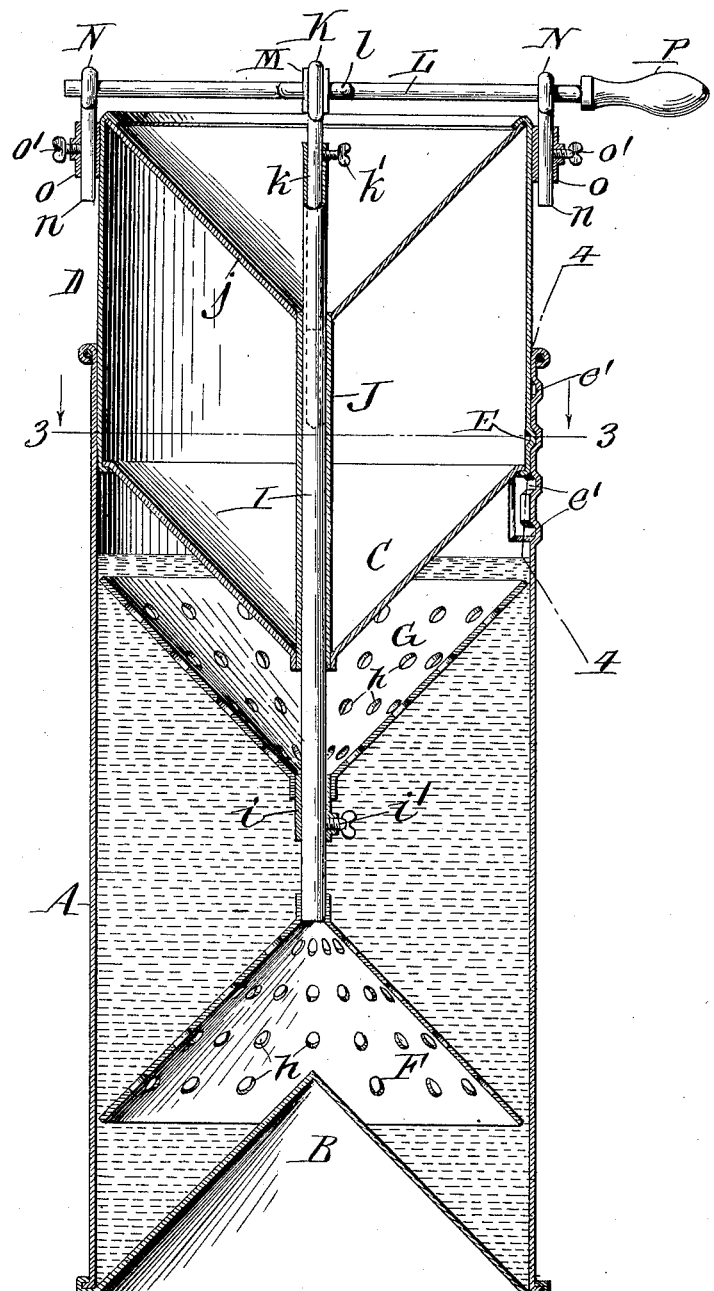

U. J. ROGERS & L. P. PEREW.
BUTTER BLENDER.
APPLICATION FILED MAR. 7, 1910.

1,007,798.

Patented Nov. 7, 1911.
2 SHEETS—SHEET 1.

Witnesses:
Richard Sommer
John H. Shoemaker

Inventors
U. J. Rogers
L. P. Perew
by Geyer & Popp
Attorneys

U. J. ROGERS & L. P. PEREW.
BUTTER BLENDER.
APPLICATION FILED MAR. 7, 1910.
1,007,798.
Patented Nov. 7, 1911.
2 SHEETS—SHEET 2.
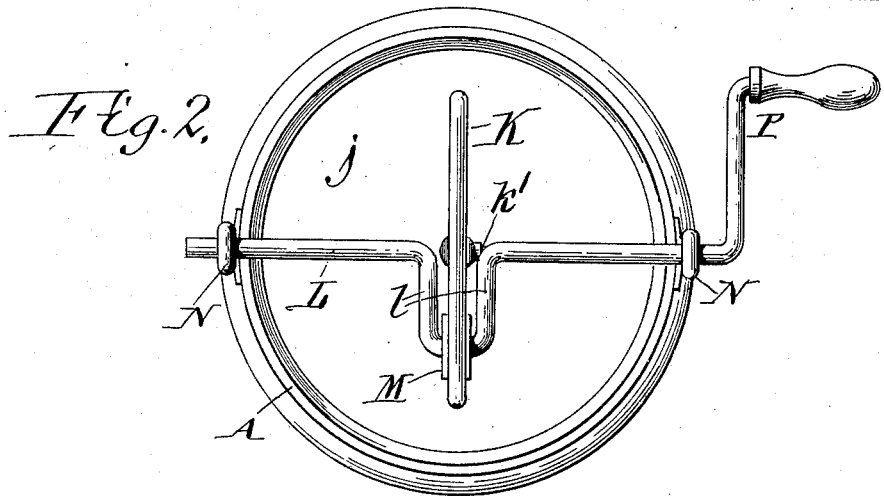
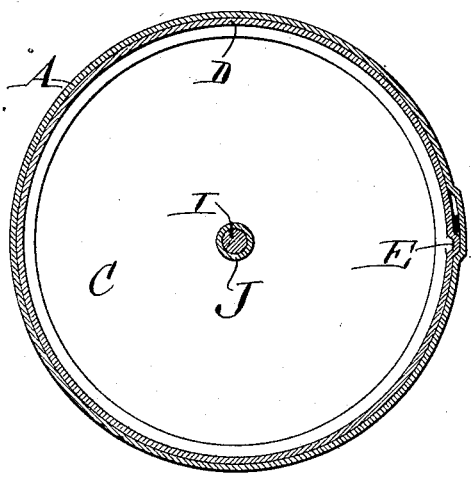
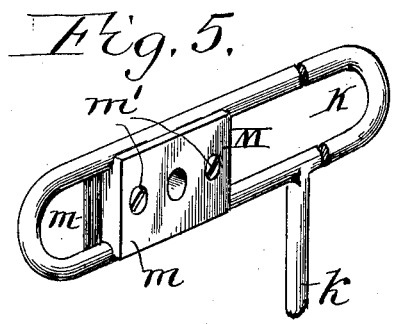
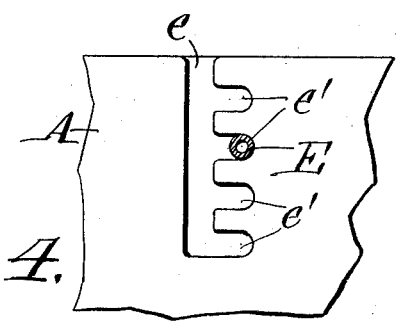
Witnesses:—
Richard Sommer
John H. Shoemaker
Inventors
U. J. Rogers
L. P. Perew
by Guyer & Popp
Attorneys.

UNITED STATES PATENT OFFICE.

ULYSSES J. ROGERS, OF TONAWANDA, AND LOUIS PHILIP PEREW, OF NORTH TONAWANDA, NEW YORK.

BUTTER-BLENDER.

1,007,798.      Specification of Letters Patent.      Patented Nov. 7, 1911.

Application filed March 7, 1910. Serial No. 547,659.

*To all whom it may concern:*

Be it known that we, ULYSSES J. ROGERS and LOUIS PHILIP PEREW, citizens of the United States, residing at Tonawanda, in the county of Erie and State of New York, and North Tonawanda, in the county of Niagara and State of New York, respectively, have invented new and useful Improvements in Butter-Blenders, of which the following is a specification.

This invention relates to a device which is more particularly designed for blending butter with cream or milk for the purpose of enriching or improving and also increasing the bulk of the butter.

It is the object of this invention to produce a device of this character which permits of blending butter and milk or cream thoroughly and intimately in a comparatively short space of time, which can be readily adjusted to suit batches of material which differ in size or bulk and which can be easily assembled and dismembered for use, cleaning or inspection.

In the accompanying drawings consisting of 2 sheets: Figure 1 is a vertical section of our improved blender. Fig. 2 is a top plan view thereof. Fig. 3 is a horizontal section in line 3—3, Fig. 1. Fig. 4 is a fragmentary vertical section in line 4—4, Fig. 1. Fig. 5 is a fragmentary perspective view of the means for operating the dashers or plungers.

Similar letters of reference indicate corresponding parts throughout the several views.

A represents the vessel or can which is adapted to receive the materials to be blended and which is preferably constructed of tin so as to form a cylindrical upright body although the same may be constructed, if desired, of other materials and other suitable forms. At the lower end of the vessel is arranged an upwardly projecting or tapering cone B which preferably also serves as the bottom of the vessel. In the upper part of the vessel is arranged a downwardly projecting or tapering cone C which is preferably mounted upon the adjacent part of the vessel wall or body so as to be removable therefrom to permit of introducing the materials to be blended into the vessel and the removal of the same therefrom after the same have been blended. The upper cone is also preferably capable of vertical adjustment in the upper end of the vessel so as to permit of adapting the space within the vessel between the upper and lower cones to suit the volume of material which is being operated upon. The preferred means for thus detachably and adjustably connecting the upper cone with the wall or body of the vessel comprises a cylindrical neck or extension D projecting upwardly from the large end of the upper cone and fitting by its periphery snugly within the bore of the vessel, a multiple bayonet groove arranged on the inner side of the upper part of the bore of the vessel and having a main upright longitudinal part or way $e$ extending to the upper edge of the vessel and a plurality of branch ways or notches $e^1$ extending laterally from one side of the main way, and a bayonet projection E arranged on the periphery of the upper cone neck or cylinder and adapted to engage with the bayonet groove of the vessel. This bayonet groove and projection are preferably formed by stamping them out of the sheet metal of which the parts on which they are mounted are constructed, thereby producing a reliable fastening at a minimum of cost.

Upon assembling the vessel and upper cone, the neck of the latter is placed in such position that the bayonet projection is vertically in line with the longitudinal way $e$ which permits this projection to enter this way upon lowering the upper cone and its neck into the vessel. When the upper cone has reached the desired position the same is turned partially so that its locking projection E engages with the branch way $e^1$ on the adjacent part of the vessel, thereby holding these parts in position relatively to each other. The neck of the top cone fits by its periphery in the bore of the vessel sufficiently tight, which prevents any material from escaping through the joint between the vessel and cover during the upward movement of the dashing device to be hereinafter described so that the same together with the upper cone practically forms a cover for the vessel. By telescoping this cover and vessel more or less the capacity of the device may be increased or diminished as may be desirable to suit the volume of material which is to be blended.

Within the lower part of the vessel is arranged an upwardly projecting or tapering conical dasher F which is preferably constructed of sheet metal and moves vertically toward and from the lower cone for coöperating therewith to blend the materials. Within the upper part of the vessel is arranged a downwardly projecting or tapering conical dasher G which moves vertically toward and from the upper cone and coöperates therewith for blending the materials. By thus arranging dashers at the upper and lower ends of the vessel the capacity of the device is doubled, rendering it possible to blend materials in one half the time required by the machines as heretofore constructed. These dashers are preferably provided with a plurality of perforations $h$ in order to permit the materials to pass through the same while operating the device. Various means may be employed for raising and lowering the dashers. The preferred means for this purpose which are shown in the drawings cause the dashers to rise and fall in unison, they permit of adjusting the dashers relatively to each other to suit the distance between the top and bottom of the vessel and the same can be readily dismembered for cleaning and adjustment. This dasher operating mechanism is best shown in Figs. 1, 2 and 5 and is constructed as follows:—I represents an upright shifting rod extending centrally through the upper cone C and the upper and lower dashers. The lower dasher is preferably secured permanently to the lower end of the shifting rod while the upper dasher is adjustably secured thereto by means of a collar $i$ which is arranged at the apex of the upper dasher and receives the shifting rod, and a clamping or set screw $i^1$ arranged on said collar and engaging with the shifting rod. Upon loosening this set screw the upper dasher may be raised or lowered on the shifting rod to the required position and then held in place by tightening this screw. The upper part of the shifting rod is guided in a sleeve J projecting upwardly from the apex of the upper cone, the upper end of this guide sleeve being braced from the upper end of the neck of the cover by means of a downwardly tapering or projecting brace cone $j$, as shown in Fig. 1. K represents a horizontal yoke which is provided centrally with a downwardly projecting shank or stem $k$ which is adjustably secured in the hollow upper end of the shifting rod by means of a set screw $k^1$. L represents a horizontal operating shaft arranged transversely across the upper end of the cover and having a two-armed crank $l$ above the central part of the cover which coöperates with the yoke for raising and lowering the dashers. The wrist of this crank is preferably pivoted or journaled in a slide M which reciprocates horizontally between the upper and lower guide faces of the yoke, thereby distributing the wear over a greater surface and also keeping the parts in alinement. This slide may be variously constructed but preferably consists of two sections $m$, $m$ which overlap opposite sides of the yoke and are secured to each other between the guide surfaces of the yoke by means of screws $m^1$. At its opposite ends the crank shaft is journaled in two bearings N each of which is preferably arranged at the upper end of a shank or stem $n$ which is detachably and adjustably secured within a socket $o$ on the adjacent part of the cover by means of a set screw $o^1$. By loosening the set screws $k^1$, $o^1$ the shanks of the yoke and the bearings N may be wholly removed from the shifting rod and cover when it is desired to clean the machine or pack the same more closely for transportation, and by securing these shanks in different positions relative to the shifting rod and cover, the same may be adapted to suit the position which the dasher should assume relative to the upper and lower cones. At one end of the driving shaft L the same is provided with a hand crank or handle P for turning the shaft manually, but if desired the same may be otherwise driven. By providing the top of the cover with a downwardly dished or tapering conical brace for supporting the upper end of the guide sleeve, a cavity or recess is produced in this part of the cover into and out of which the yoke and operating crank of the driving shaft can move while using the machine, thereby avoiding the necessity of making the device excessively high to accommodate the working parts.

Our improved blender has no delicate parts which are liable to get out of order, the same can be readily dismembered so as to permit of thoroughly cleaning the same and is easily assembled for use, the several parts can be conveniently adjusted to adapt them to the amount of material which is to be treated, and its capacity is considerably greater than machines heretofore known for this purpose without involving any material increase in its cost of manufacture.

We claim as our invention:

1. A butter blender comprising a vessel having an upwardly projecting stationary cone at its lower end, a normally stationary downwardly projecting cone arranged at the top of the vessel, an upwardly projecting conical dasher arranged in the lower part of the vessel and coöperating with the lower stationary cone, a downwardly projecting upper conical dasher arranged in the upper part of the vessel and coöperating with the upper stationary cone, and means for raising and lowering said dashers comprising a vertically movable rod which is guided in the upper stationary cone and to which the upper and lower dashers are secured.

2. A butter blender comprising a vessel having an upwardly projecting stationary cone at its lower end, a normally stationary downwardly projecting cone arranged at the top of said vessel, a lower upwardly projecting conical dasher arranged in the lower part of the vessel and coöperating with the lower stationary cone, an upwardly projecting upper conical dasher arranged in the upper part of the vessel and coöperating with the upper stationary cone, and means for raising and lowering said dashers and adjusting the same vertically relatively to each other.

3. A butter blender comprising a vessel having an upwardly projecting stationary cone at its lower end, a normally stationary downwardly projecting cone arranged at the top of said vessel, a lower upwardly projecting conical dasher arranged in the lower part of the vessel and coöperating with the lower stationary cone, an upwardly projecting upper conical dasher arranged in the upper part of the vessel and coöperating with the upper stationary cone, and means for raising and lowering said dashers and adjusting the same vertically relatively to each other comprising a vertically movable rod which is guided in said upper stationary cone and on which the lower dasher is permanently secured while the upper dasher is capable of being adjusted lengthwise thereon.

4. A butter blender comprising a vessel having an upwardly projecting stationary cone at its lower end, a normally stationary downwardly projecting cone capable of vertical adjustment on the upper part of said vessel, a lower upwardly projecting conical dasher arranged in the lower part of the vessel and coöperating with the lower cone, and an upwardly projecting upper conical dasher arranged in the vessel and coöperating with said upper cone.

5. A butter blender comprising a vessel having an upwardly projecting stationary cone at its lower end, a normally stationary downwardly projecting cone capable of vertical adjustment on the upper part of said vessel, a lower upwardly projecting conical dasher arranged in the lower part of the vessel and coöperating with the lower cone, an upwardly projecting upper conical dasher arranged in the vessel and coöperating with said upper cone, and means for raising and lowering said dashers and adjusting the same vertically one relatively to the other.

6. A butter blender comprising a vessel having an upwardly projecting lower cone at its lower end, a downwardly projecting upper cone arranged in the upper part of the vessel, means for adjusting the upper cone vertically on the vessel comprising a cylindrical upward extension arranged on the upper cone and provided with a lateral projection adapted to engage with a bayonet groove in the bore of the vessel, a lower upwardly projecting conical dasher coöperating with the lower cone, and an upper downwardly projecting conical dasher coöperating with the upper cone.

7. A butter blender comprising a vessel having an upwardly projecting lower cone at its lower end, a downwardly projecting upper cone arranged in the upper part of the vessel, means for adjusting the upper cone vertically on the vessel comprising a cylindrical upward extension arranged on the upper cone and provided with a lateral projection adapted to engage with a bayonet groove in the bore of the vessel, a lower upwardly projecting conical dasher coöperating with the lower cone, an upper downwardly projecting conical dasher coöperating with the upper cone, and means for raising and lowering the dashers and adjusting the same vertically relatively to each other.

8. A butter blender comprising a vessel having an upwardly projecting lower cone at its lower end, a downwardly projecting upper cone arranged in the upper part of the vessel, means for adjusting the upper cone vertically on the vessel comprising a cylindrical upward extension arranged on the upper cone and provided with a lateral projection adapted to engage with a bayonet groove in the bore of the vessel, a lower upwardly projecting conical dasher coöperating with the lower cone, an upper downwardly projecting conical dasher coöperating with the upper cone, and means for raising and lowering the dashers and adjusting the same vertically relatively to each other comprising a vertically movable rod which is guided on the upper cone and on which the lower dasher is permanently mounted and on which the upper dasher is adjustable vertically.

9. A butter blender comprising a vessel having normally stationary cones at its top and bottom, two conical dashers movable vertically in the vessel between said stationary cones, and means for operating said dashers comprising a rod guided on the upper cone and carrying the dashers and provided above the upper cone with a yoke, and a shaft having a crank working in said yoke.

10. A butter blender comprising a vessel having an upwardly projecting lower cone at its lower end, a downwardly projecting upper cone arranged on the upper part of the vessel, means for adjusting the upper cone vertically on the vessel comprising a cylindrical upward extension arranged on the upper cone and adjustable vertically on the vessel, and means for operating said dashers comprising an upright rod guided in the upper cone and connected with the dashers, a yoke arranged on the upper end of the rod, and a transverse shaft journaled on the cylindrical extension and having a crank working in said yoke.

11. A butter blender comprising a vessel having an upwardly projecting lower cone at its lower end, a downwardly projecting upper cone arranged in the upper part of the vessel, means for adjusting the upper cone vertically on the vessel comprising a cylindrical upward extension arranged on the upper cone and adjustable vertically on the vessel, and means for operating said dashers comprising an upright rod guided on the upper cone and connected with the dashers, a horizontal yoke having a depending stem which is adjustably secured to the upper end of said rod, bearings adjustable vertically on opposite sides of said cylinder, and a horizontal transverse shaft having a crank which works in said yoke.

12. A butter blender comprising a vessel having an upwardly projecting cone at its lower end, a cover detachably connected with the upper end of the vessel and having a cylindrical body and provided with a downwardly projecting cone at its lower end, a downwardly projecting conical or dished brace at its upper end and a guide sleeve connecting the cone and brace of said cover, an upright shifting rod guided in said sleeve, upper and lower conical dashers mounted on the shifting rod within the vessel and coöperating with the upper and lower cones, a yoke arranged on the upper end of the shifting rod, and a shaft journaled in bearings at the upper end of said cover and provided with a crank working in said yoke.

Witness our hands this 28th day of February, 1910.

ULYSSES J. ROGERS.
LOUIS PHILIP PEREW.

Witnesses:
ED H. ROGERS,
ARTHUR W. BRADSHAW.

Copies of this patent may be obtained for five cents each, by addressing the "Commissioner of Patents, Washington, D. C."